US008646049B2

(12) United States Patent
Goeller et al.

(10) Patent No.: US 8,646,049 B2
(45) Date of Patent: Feb. 4, 2014

(54) SYSTEMS AND METHODS FOR SECURE MANAGEMENT OF PRESENCE INFORMATION FOR COMMUNICATION SERVICES

(75) Inventors: Thomas Anton Goeller, Munich (DE); Tet Hin Yeap, Ontario (CA)

(73) Assignee: Toposis Corporation, Ottawa, Ontario ( * ) Notice: Subject to any disclaimer, the term of this patent is extended or adjusted under 35 U.S.C. 154(b) by 555 days.

(21) Appl. No.: 12/989,930

(22) PCT Filed: Apr. 30, 2009

(86) PCT No.: PCT/CA2009/000572
§ 371 (c)(1),
(2), (4) Date: Oct. 27, 2010

(87) PCT Pub. No.: WO2009/132446
PCT Pub. Date: Nov. 5, 2009

(65) Prior Publication Data
US 2011/0038483 A1 Feb. 17, 2011

Related U.S. Application Data

(60) Provisional application No. 61/050,153, filed on May 2, 2008.

(51) Int. Cl.
*H04L 29/06* (2006.01)
(52) U.S. Cl.
USPC .......................................................... 726/4
(58) Field of Classification Search
USPC .......................................................... 726/4
See application file for complete search history.

(56) References Cited

U.S. PATENT DOCUMENTS

| 6,718,387 | B1 * | 4/2004 | Gupta et al. | 709/226 |
| 6,928,167 | B1 * | 8/2005 | Maeda et al. | 380/285 |
| 7,035,923 | B1 | 4/2006 | Yoakum et al. | |
| 7,313,691 | B2 * | 12/2007 | Bantz et al. | 713/155 |
| 2003/0105864 | A1 | 6/2003 | Mulligan et al. | |
| 2005/0015471 | A1 | 1/2005 | Zhang et al. | |
| 2005/0027862 | A1 | 2/2005 | Nguyen et al. | |
| 2005/0163108 | A1 | 7/2005 | Moore et al. | |
| 2006/0004896 | A1 * | 1/2006 | Nelson et al. | 707/206 |

(Continued)

*Primary Examiner* — Michael S McNally
(74) *Attorney, Agent, or Firm* — Ridout & Maybee LLP

(57) ABSTRACT

Systems and methods are provided for managing user information comprising presence information, wherein authentication of requesting parties is based on public-private key pair encryption and key Domain Name Service (kDNS) infrastructure. Thus, a response to a request for presence information may be dependent on the authentication status of the requesting party. Presence information stored on a presence server or other network element may be stored or updated upon receiving a request from a user which includes the requestors identify, and is signed with the private key of the requestor. After authentication of a user having a registered unique identifier and an associated public key, presence information may be stored or updated, in either encrypted or unencrypted form. Presence information is preferably stored with user specified policy information for managing access to the presence information by other users, e.g. what information may be shared with anonymous or unauthenticated other users, or with other specific authorized users, or authorized user groups. Advantageously, all communications between communication parties and network elements of the system are encrypted. A scalable and distributed system and method is provided for managing exchange of dynamic information, such as presence information, between users of communications and network services, with improved reliability, security, and personalization. Systems and methods are particularly applicable for securely managing exchange of presence information and other information for multiparty communications service and for peer-to-peer network services.

17 Claims, 10 Drawing Sheets

(56) References Cited

U.S. PATENT DOCUMENTS

| | | |
|---|---|---|
| 2006/0226950 A1 | 10/2006 | Kanou et al. |
| 2006/0288099 A1 | 12/2006 | Jefferson et al. |
| 2007/0022162 A1* | 1/2007 | Thayer et al. ............... 709/206 |
| 2007/0233859 A1 | 10/2007 | Zhao et al. |
| 2008/0072301 A1 | 3/2008 | Chia et al. |
| 2008/0117839 A1 | 5/2008 | Raju et al. |

* cited by examiner

SYSTEMS AND METHODS FOR SECURE MANAGEMENT OF PRESENCE INFORMATION FOR COMMUNICATION SERVICES

CROSS REFERENCE TO RELATED APPLICATION

This application is related to U.S. patent application Ser. No. 11/601,872 filed 20 Nov. 2006 entitled "Open and distributed systems for secure email", PCT application No. PCT/CA2007/002061 filed 20 Nov. 2007 entitled "Systems and methods for providing secure communications services", and priority documents thereof, and claims priority from U.S. Provisional application No. 61/050,153 filed 2 May 2008. The entire contents of these prior applications are incorporated herein by reference.

TECHNICAL FIELD

The present invention relates to management of presence information, and in particular relates to systems and methods for secure management of presence information for communications services, including peer-to-peer network services.

BACKGROUND OF THE INVENTION

An electronic communication can be requested or initiated by one communication party with various levels of knowledge about the availability of an other communication party or parties:
1. In offline mode—e.g. by sending an email which will wait to be read by the recipient whenever she checks her email.
2. In a trial and error fashion—e.g. by placing a telephone call without knowing whether the called party is available and willing to take the call.
3. With presence information, that is by querying a "presence server" before issuing a communication request to obtain information relating to another party's availability and communication preferences. The information returned by this server may provide any of the following data, among others:
    Presence and availability—e.g. whether the receiver is logged in to one or more communication applications;
    Current status—e.g. whether the receiver is willing to receive a communication, or does not want to be disturbed;
    Communication preferences and access information—which communication channel and medium is presently preferred by the receiver for incoming communication request, e.g. fixed line or mobile number.

Presence servers are an integral building block of peer-to-peer (P2P) networks, where communication data—e.g. digitized voice, media, file attachments or other data—may be directly sent from one user to another, or from the source to the consumer. For this type of network, a presence server is necessary to determine how a communication partner can be reached—e.g. by returning the present IP address of the communication partner. The presence server may also offer other information related to a P2P network client, e.g. which files or which parts of files are available at the client for distribution.

P2P communication networks are effective for reducing central server load and server bandwidth requirements for such applications as distribution of copyrighted content (such as music, video, books, newspapers, software) that is charged upon use and protected by digital rights management (DRM), for distribution of open source software, point-to-point telephony and video conferences, among other uses.

Typically, a communication party may have several communication addresses or user identifiers, and a user may have presence information associated with or belonging to one or several user identifiers. Presence data may be associated with other user information or personal information. Since information on the presence and availability of a communication party is dynamic (i.e. may be updated regularly) management of presence data may present more challenges than managing other personal/user information.

As of now, most peer-to-peer networks are provided by proprietary and disparate frameworks, each with their own presence information server infrastructure and interfaces. Some applications—such as chat—have clients that can communicate with several frameworks. However, following up on every emerging new P2P framework and support its interfaces to allow inter-working of multiple networks would require significant effort and frequent client updates.

This means that potential users typically have to register for different identities with each kind of P2P network they want to use—e.g. Skype, another VoIP telephony application, a chat application and a social website with online interaction. Specific presence information—e.g. "Do not disturb, except in very urgent cases!"—has to be entered in every framework used. At any time, users have to think about which information about themselves they can and they want to publish in which network.

Because of this lack of interworking, unless users are willing to maintain identities and presence information for multiple networks, users tend to be tied to one application or a limited number of applications. Security may also be a concern. Early identity management approaches, such as Passport™ from Microsoft, have not been widely adopted, possibly because users were unwilling to expose so much of their personal information to a single global broker.

Thus, currently available systems have limitations with respect to managing or interrelating several identities, and managing presence and personal information in different application frameworks. Lack of authentication of users presents problems in managing presence information, for example, if user prefers not to share presence information with all other users, A user may not be able to verify the identity of other users before sharing presence information, or thus may not be able to control or select which other users may or may not have access to presence information.

A number of standards-based approaches exist for managing identity and presence information, for example:
1. The IP Multimedia Subsystem (IMS) by 3GPP. This requires an extensive unified architecture connecting the communication partners. It is believed that if at all, it will take decades, until this architecture is deployed with the majority of network operators and Internet Service Providers (ISP).
2. Electronic Numbering (ENUM) defined in RFC3761 is a specific approach designed for the interconnection of different telephony technologies based on telephone numbers.
3. Web Identity Management frameworks such as OpenID (www.openid.net), Prime (www.prime-project.eu), or Cardspace (www.cardspace.netfx3.com) may be used for identity, and dynamically, for presence information. However, it is not clear, at this time, how identities and associated information in these different frameworks can be searched and interrelated.

Nevertheless, these solutions are not yet widely deployed, and interworking of different systems remains an issue. So, currently available approaches to managing presence and availability information for multiple applications or modes of communication in disparate frameworks have limitations, and improved or alternative solutions are required.

SUMMARY OF INVENTION

The present invention seeks to overcome or at least mitigate the aforementioned limitations of known systems and methods for managing presence information, or at least provide an alternative.

To this end, embodiments of the present invention provide systems and methods for management of presence information comprising authentication of communication parties based on private-public key pair encryption and key domain name service (kDNS), and advantageously also provide for encryption of communications between communication parties and network elements. Applications may include management of user information comprising presence information for communications services and peer-to-peer services, with improved security and personalization.

One aspect of the invention provides a system for managing presence information for communication services comprising:

at least one network element comprising a presence server storing presence information for a plurality of communication parties;

means for authenticating a communication party requesting presence information management comprising:

client means for generating a request from a communication party for management of presence information, the request comprising a unique identifier of the requesting party and being signed with the private key of a public-private key pair of the requesting party; and server means for querying a key Domain Name Service (kDNS) for the respective public key of the requesting party and authenticating the requesting party and returning a response to the request for presence information management dependent on an authentication status of the requesting party.

Another aspect of the invention provides a method of managing presence information stored on at least one network element, comprising a step of authenticating a communication party requesting presence information management by steps comprising:

receiving a request from a communication party for management of presence information, the request comprising a unique identifier of the requesting party and being signed with the private key of a public-private key pair of the requesting party;

querying a key Domain Name Service (kDNS) for the respective public key, authenticating the requesting party, and returning a response dependent on an authentication status of the requesting party.

Thus a system and method is provided for authentication of requesting parties based on public-private key pair encryption using kDNS, wherein public keys of public-private key pairs bound to user identifiers such as email addresses or other communications addresses, and public keys of communication parties are managed by a kDNS service, which provided for look-up and retrieval of public keys by other users. Consequently, a response to a request for management of presence information, e.g. storage or retrieval of presence information, may be dependent on the authentication status of the requesting party.

Another aspect of the invention provides a method of managing presence information for a plurality of communication parties, comprising:

authenticating a party requesting presence information management by steps of:

receiving from the requesting party a request for presence information management comprising a unique identifier of the requesting party and a corresponding encrypted identifier encrypted with the private key of a public-private key pair of the requesting party;

querying a key domain name service (kDNS) for a public key associated with the unique identifier of the requesting party, decrypting the request, and authenticating the requesting party; and, returning a response to the request for presence information management dependant on an authentication status of the requesting party.

Returning a response to the request for presence information management may comprises one of:

a. storing presence information associated with an authenticated requesting party;

b. retrieving presence information associated with a unique identifier of another party requested by the authenticated requesting party;

c. otherwise terminating the request for an unauthenticated requesting party.

Storage of presence information may comprise storing new information, or updating existing information. Presence information may be stored with information determining access privileges for access by other parties to presence information of the authenticated party, so that a response may be in accordance with access privileges for the authenticated party. A query to a whitelist or blacklist or other third party system may also be included.

Any known protocol may then be used to return presence information or other associated user information from a storage network element, and to forward it to the requesting party.

Where presence information is associated with chargeable content the method may include receiving confirmation of a successful online charge or charge reservation request before permitting access to the requested content.

Presence information stored for each authenticated party may comprise presence information associated with one communication address, or with each of a plurality of communication addresses of the authenticated party, or aliases thereof.

Access privileges are established by a communication party for individual other communication parties or groups of communication parties. Thus authentication of users provides for improved security and personalization in managing presence information, and for example, an owner is provided with improved control in selecting which other users may or may not have access to his presence information, and associated user information.

Preferably all communications between parties and/or network elements are encrypted, e.g. communications between a user/client and a network element are encrypted by the sender with the public key of the recipient, to allow for decryption using the private key of the recipient on receipt of the communication, and access to presence information may be restricted to authenticated parties only. Systems and methods are particularly applicable for securely managing exchange of presence information and other information for peer-to-peer network services.

Another aspect of the invention provides is a system for managing presence information for communication services, comprising:

at least one network element comprising a presence server storing presence information for a plurality of communication parties, the network element comprising processing means for authenticating a party requesting presence information by steps comprising:

receiving from the requesting party a request for presence information management comprising a unique identifier of the requesting party and a corresponding encrypted identifier encrypted with the private key of a public-private key pair of the requesting party;

querying a key domain name server (kDNS) system for a public key associated with the unique identifier of the requesting party, decrypting the request, and authenticating the requesting party; and, means for returning a response to the request for presence information management dependent on an authentication status of the requesting party.

Yet another aspect of the invention provides a client server system for managing storage and retrieval of presence information for communications services for a plurality of communication parties, each party having a unique identifier and an associated public-private key pair:

at least one network element comprising a presence server storing presence information for each of a plurality of communications parties;

a key Domain Name Service (kDNS) system storing for each communication party a unique identifier and the respective public key for public-key look-up and retrieval; and, each communication party having a client associated with their unique identifier and providing secure access to the respective private key of the communication party;

the at least one network element comprising processing means for receiving from a client a request for storage or retrieval of presence information associated with a unique identifier of a communication party, the requesting client providing at least a unique identifier of the requesting party, and a corresponding encrypted identifier encrypted with the private key of the requesting party;

querying the kDNS system for the public key associated with the unique identifier of the requesting party, decrypting the request, and authenticating the requesting party;

and returning a response dependent on the authentication status of the requesting party.

Also provided is a communication client for a client-server system for management of user information comprising presence information for plurality of users of communications services stored on a at least one network element comprising a presence server, wherein each communication party has a unique identifier and an associated public-private key pair, and wherein unique identifiers and respective public keys for each communication party are stored in a key domain name server (kDNS) system for public-key look-up and retrieval, the client comprising:

means for generating a request for management of presence information, the request comprising the unique identifier of the communication party and an encrypted identifier encrypted with the private key of the requesting communication party; and means for querying the kDNS server for the public key associated with the unique identifier of the network element, and for authenticating a response received from the network element encrypted the private key of the network element.

Yet another aspect of the invention provides a method of providing a secure communication session for a plurality of users of peer to peer services, wherein user information comprising presence information is stored on at least one network element comprising a presence server, wherein each user has a unique identifier and an associated public-private key pair, and wherein unique identifiers and respective public keys for each user are stored in a key domain name server (kDNS) system for public-key look-up and retrieval, the method comprising:

receiving from a communication client of a first user a request for presence information for a second user, said request being signed with the private key of the first user;

issuing a kDNS request for look up and retrieval of the public key of the first user;

decrypting the request and authenticating the first user, and responding to the request by returning presence information of the second user dependent on the authentication status of the first user;

receiving from the communication client of the first user a communication request for communication with a client of the second user dependent on said presence information returned for the second user, issuing a kDNS request for the public key of the second user, and forwarding to the second user said communication encrypted with the public key of the second user;

on receiving a communication accept response from the client of second party establishing a communication session between clients of first and second parties.

Advantageously, communication requests from clients of first and second users for establishing a communication session are signed with the respective private key of the originating client, to enable authentication by the receiving client using the public key of the originating client. The method may be applicable for example for establishing a call session or a file transfer session in a client-server or peer to peer network.

Thus systems and methods are provided for management of user information comprising presence information, wherein authentication of a requesting party using kDNS enables a response to a request for presence information management to be dependent on the authentication status of the requestor, and enables presence information to be managed with improved reliability, security, and personalization, even across several different applications and networks. A scalable and distributed system and method is provided for managing exchange of dynamic information, such as presence information, between users of different communications and network services.

When systems and methods according to embodiments of the present invention are deployed in peer-to-peer networks, authentication and encryption based on public-private key pair encryption and kDNS service provides for improved management and security in of peer-to-peer communications sessions and chargeable network services.

BRIEF DESCRIPTION OF DRAWINGS

Various features, objects and advantages of the invention will become apparent from the following description of preferred embodiments of the invention which are described, by way of example only, with reference to the accompanying drawings, in which.

In the drawings, identical or corresponding elements in the different Figures have the same reference numeral.

DETAILED DESCRIPTION OF PREFERRED EMBODIMENTS

Figure 1:
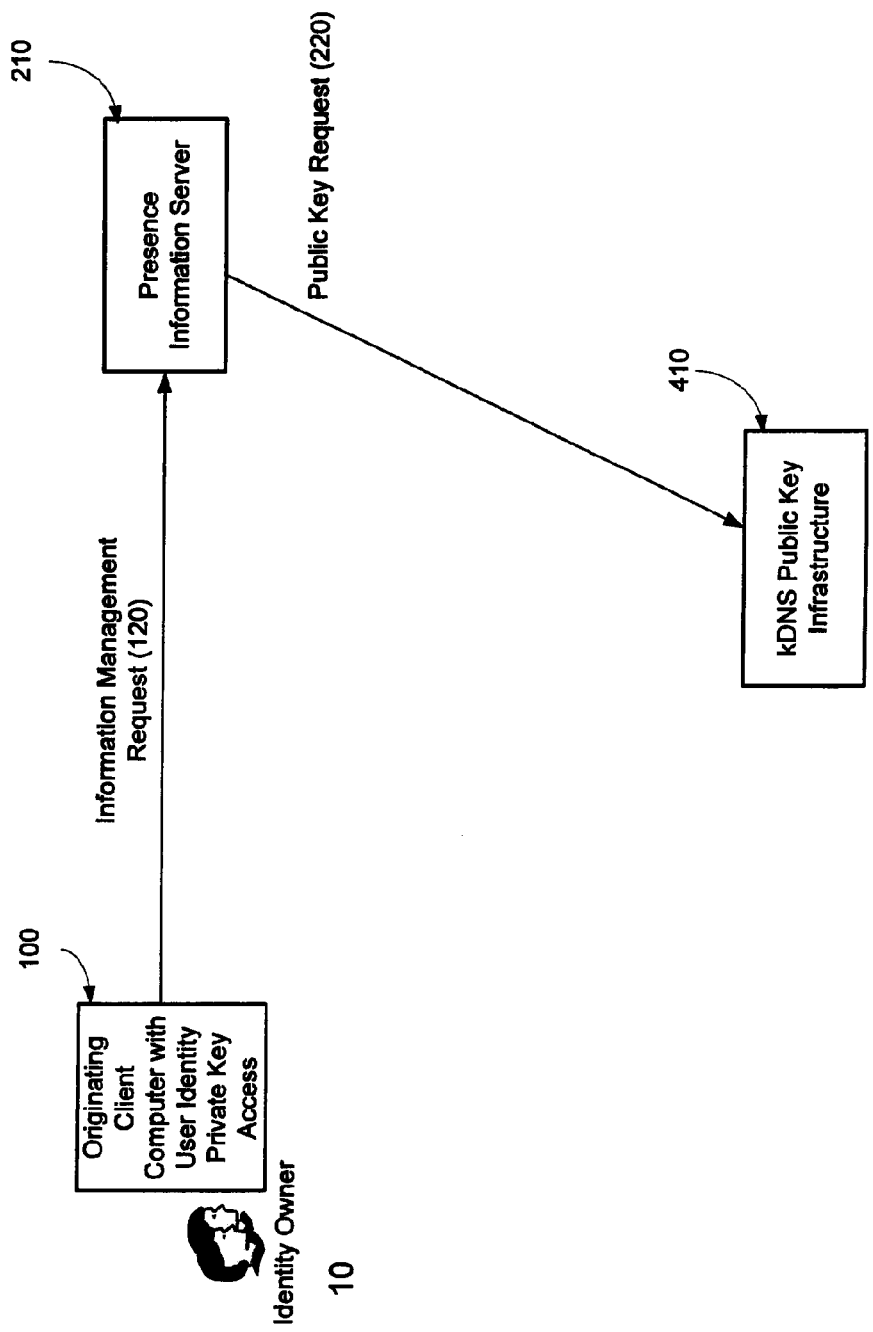
FIG. 1 shows elements of a system for management of presence information comprising storing or updating presence information according to a first embodiment of the invention.

The reader is referred to the inventors' copending PCT application no. PCT/CA2007/002061, entitled "System and method for providing secure communications services" which is incorporated herein by reference, for further description of public-private key pair encryption and key Domain Name Service (kDNS) infrastructure for secure communications services.

Embodiments of the present invention provide systems and methods for managing user information comprising presence information, which comprise authentication of parties requesting presence information management, based on public-private key pair encryption and kDNS infrastructure, wherein public keys of public-private key pairs bound to user identifiers such as email addresses or other communications addresses, and public keys of communication parties are managed by a kDNS service, which provides for look-up and retrieval of public keys by other users. Thus a response to a request for management of presence information an/or associated user information may be dependent on the authentication status of the requesting party.

Access to presence information may then be restricted to authenticated parties only, or access privileges determined by authentication status of the requesting party.

Advantageously, all communications between parties and/or network elements having a unique identifier and an associated public-private key pair may be encrypted, i.e. communications between a user/client and a network element are encrypted by the sender with the public key of the recipient, to allow for decryption using the private key of the recipient on receipt of the communication. Systems and methods according to embodiments of the invention, as will be described in more detail below, are therefore are particularly applicable for securely managing exchange of presence information and other dynamic information for peer-to-peer network services.

Embodiments of the present invention will now be described below, which provide for authentication of parties requesting management of user information comprising presence information, and encryption of communications between parties, based on private-public key pair encryption and key domain name service (kDNS):
1. Management—e.g. creation, modification and deletion—of personal and presence information pertaining to a user's identity (FIG. 1)
2. Retrieval of information pertaining to any identity (FIG. 2)
3. Delivery of peer-to-peer services using presence information stored on a presence and personal information server (FIG. 3 and FIGS. 4a, 4b, 4c)
4. Establishing a secure multiparty communications session using presence information (FIG. 5 and FIGS. 6a, 6b, 6c).

In summary, in embodiments described below, there is at least one network element storing presence information securely, the network element having a unique identifier and an associated (attached) private-public key pair. Each registered user or client has a unique identifier and an associated private-public key pair. Private keys are held securely by their owners, and each unique identifier and associated public keys are stored on a kDNS server system for look-up and retrieval of public-keys of other users, clients or network elements (see PCT/CA2007/002061). Presence information is stored on a presence server or other network element and presence information may be stored or updated upon receiving a request from a user which includes the requestors identify, and is signed with the private key of the requestor. After authentication of a user having a registered unique identifier and an associated public key, presence information may be stored (new or updated data) in either encrypted or unencrypted form. Presence information is preferably stored with user specified policy information for managing access to the presence information by other users, e.g. what information may be shared with anonymous or unauthenticated other users, or access privileges for other specific individual authorized users, or authorized user groups.

Presence information may be accessed by other users by sending a request for presence information, including the requestors identity, signed by the requestors private key, to enable authentication of the requestor. If an authenticated requestor is authorized to have access (ie. has appropriate access privileges), presence information will be provide to the requestor encrypted with the private key of the sender, which may e.g. be the private key of the presence server or other network element storing the information &/or the private key of the owner of the originating user.

Referring now to FIG. 1, which represents elements of a communication network and steps for management of presence information by a user 10 having a unique user identifier associated with a public-private key pair of the user, the user 10 issues an Information Management Request 120 from a client computer 100 towards a Presence and Personal Information Server 210. The request can use standard Internet technologies, e.g. HTTPS. The request 120 has to be signed by the client 100 with the private key of the requesting user identity—e.g. joe.smith@hotmail.com—for authentication. To allow for authentication, the identity for which personal information shall be managed must appear in clear text in the request and in the signature encrypted by the private key associated with this identity. The Presence Server 210 checks the request signature by looking up the corresponding public key for the requesting identity in the Key DNS Public Key Infrastructure 410. Any Key DNS server can be asked for the public key. Depending on the domain associated with the user identity to be authenticated, the addressed Key DNS server will either return the public key directly or from cache or will redirect the public key request to some other Key DNS server in the Key DNS hierarchy 410 as described in the above referenced copending patent applications.

If a public key is found for the requesting identity, and if the public key can decrypt the signature in the Information Management Request 120, the request is authenticated. The user may now create new personal and presence information pertaining to this identity, or modify or delete existing personal and presence information pertaining to this identity.

To facilitate management of personal information for multiple user identities belonging to one user, a client authenticating itself with one user identity may allow another user identity to manage information related to the first user identity or to both user identities, such as, but not restricted to, contact preference settings, whitelists and blacklists. If, for example, a user holds the identities joe.smith@hotmail.com and "+1 613 123-4567", he may allow the information pertaining to "+1 613 123-4567" to be edited by a client authenticating itself as joe.smith@hotmail.com.

If several identities of a user have been associated beforehand—e.g. joe.smith@hotmail.com and +1 613 123-4567 (Joe's email address and his telephone number)—it is possible to edit information pertaining to any of the identities after authentication of one of the identities in a Information Management Request 120. This is particularly useful when a user may want to manage presence information linking 2 or more identities, which may indicate, for example: "Presently I prefer being contacted via my email address joe.smith@hotmail.com, but in urgent cases you can still call me on +1 613 123-4567".

Since the requesting party, in this case the owner of the presence information, must be authenticated, only a user identity associated with the presence information will have the right to create new presence information or update existing information pertaining to the associated identity or identities.

For certain applications, it may be desirable to create aliases for a user identity. An alias identity points to the same public/private pair as the original user identity. Alias relationships must be public to suppress fraud opportunities. Thus where a kDNS hierarchy accepts alias definitions, a request for a public key associated with an alias user identity returns the public key of the user identity behind the alias user identity. That is, configuration in kDNS of an alias user identity consists of a command specifying the alias user identity and the basic user identity it points to, whereas configuration of a basic user identity consists of a command specifying the user identity and the public key associated with it.

Figure 2:
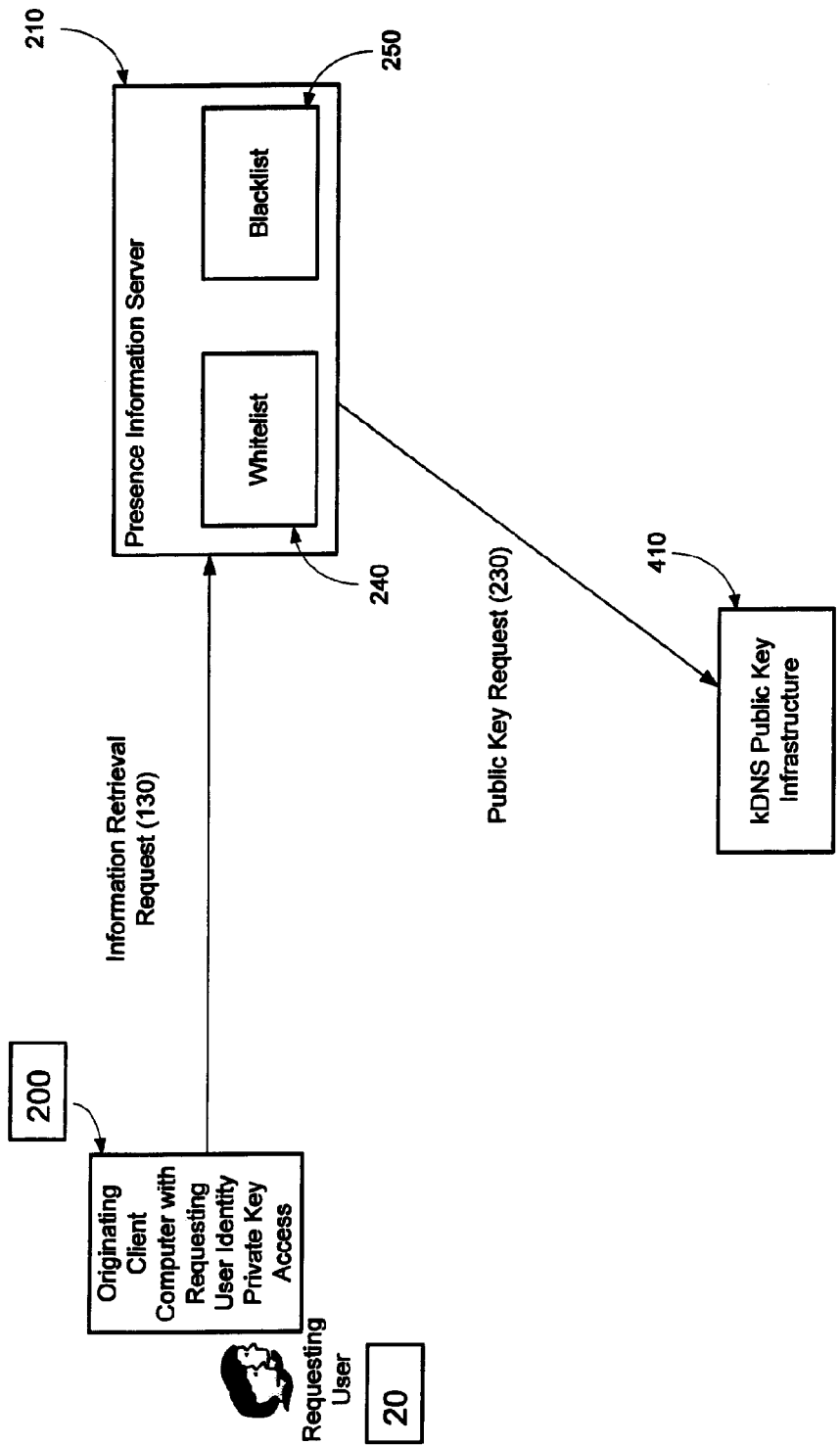
FIG. 2 shows elements of a system for management of presence information comprising retrieval of presence information according to a second embodiment of the present invention.

Referring now to FIG. 2, which represents network elements of a system for managing presence information, comprising retrieval of presence information of another user, a user 20 desiring information pertaining to another user identity, issues an Information Retrieval Request 130 from her client computer 200. The user may or may not sign the request with one of her identities. If the request is unsigned, it is treated as anonymous, and only information to be released for anonymous access will be returned. If the request is signed, the Presence Information Server 210 will issue a public key request and, if found, will retrieve the public key of the identity signing the request 130 from the Key DNS Public Key Infrastructure 410. If a public key is returned for this identity, and if the public key can decrypt the signature in the Information Retrieval Request 130, the requesting user 20 is authenticated. Her request will be checked against the Whitelist 240 and the Blacklist 250 applicable for the requested information. If the requesting identity is in the whitelist and not in the blacklist for the information required, the requested personal or presence information will be delivered. If not, an error message will be returned.

The decision to grant another user access to personal information, which may comprise presence information, may be based on criteria which may e.g. include
    querying a Whitelist;
    querying a Blacklist;
    querying a third party system;
    obtaining confirmation of a successful online charging or charge reservation request.

These criteria may be part of the personal information associated with a user identity. Different criteria or access policies may be applied or specified to access different parts of user information, e.g. for communications relating to a business address and a home address).

It will be appreciated that if each communicating party, client or network element has a unique identity and associated public-private key pair, all communications between parties may be encrypted. For example, a client encrypts a request using the public key associated with a known server identity, where the public key of the server is stored for look up and retrieval in the kDNS hierarchy, so that only the server holding the corresponding private key can decode the request. Correspondingly, the server storing presence information and/or other user information which may comprise personal, presence and peer-to-peer network information, encrypts the information sent to the client with the public key associated with the identity of the requesting client, thereby ensuring that only the client holding the corresponding private key can decode the transmitted information.

It will also be appreciated that in a secure environment, the role of controlling access to information can be separated from the storage of that information. Network elements controlling access to information will authenticate the user identity and determine access privileges, dependent on authentication status, to enable a decision on whether or not to respond to or grant a request. If a requesting party is not authenticated the system may, for example, time out and not respond, return an error message, return a response with only default information available to anonymous users, or otherwise terminate the request.

When a user or requestor has been authenticated and access privileges are determined, any other known protocol may be used to store, update or retrieve presence information from a presence server and/or for retrieval and storage of other associated information from a storage element.

Because requesting parties are authenticated, an owner of presence information may set access privileges for individual other parties, or for groups of other parties, and/or limit information made available to unauthenticated or anonymous parties. Thus the user has improved control over which other users may or may not access presence information and may personalize presence information accordingly. To facilitate creation and maintenance of access privileges, access privileges may be set to allow authenticated users contained in a group to have information management and access rights associated with the group. Groups may be nested. Group members may be given different administration rights for the group (e.g. to add or remove members). A group may be defined by a unique identity that points to a collection of basic or alias user identities, or to subordinate group identities.

To support certain business or communication procedures, it may be required that a set of identities consent to an information request. For specified user identities, the consent may be automatically granted. In colloquial language, this could be exemplified as "I want to know who requests my mobile number—except if they come from the group w-h-smith-family@gmail.com who may always have it."

The consent mechanism may also be used for business processes, for example, when a processing step requires confirmation by one or several individuals or members of a particular group, or fulfillment of certain prerequisites or conditions. It is also applicable for online charge reservation and charging for payable content. Rejection of consent may either consist of an explicit rejection message or of the lack of a confirmation message during a defined period of time (confirmation period). Consent requests to other user identities and responses thereto may be authenticated and encrypted using kDNS in a fashion equivalent to the original presence information request and response, which may include application of a whitelist, blacklist or other criteria.

A client or user may set preferences to request notification of requests by other specific user identities, and a user may configure their client software to automatically grant consent to requests from specific user identities or user groups, or specific server identities. Authentication of server identities may be made by a kDNS query, as for authentication of other user identities.

It will also be appreciated that where presence information is associated with other user information, such as personal information or peer-to-peer network information, similar authentication and encryption systems and methods may be applied for managing access to this information as well as presence information, and for encrypting communications between client and server, and other communication parties.

Where appropriate, presence information and/or other associated user information is stored in encrypted form.

While the presence information server represented in FIGS. 1 and 2 may comprise a single network element, in alternative embodiments, separate network elements may be provided for storing presence information and/or for storing associated user information, and for controlling access or applying access policies. Optionally, access privileges may be associated with or define interaction requirements that trigger a controlling network element to inform an information owner when an authenticated user identity requests information, and request permission to deliver the information to the requesting user.

Figure 3:
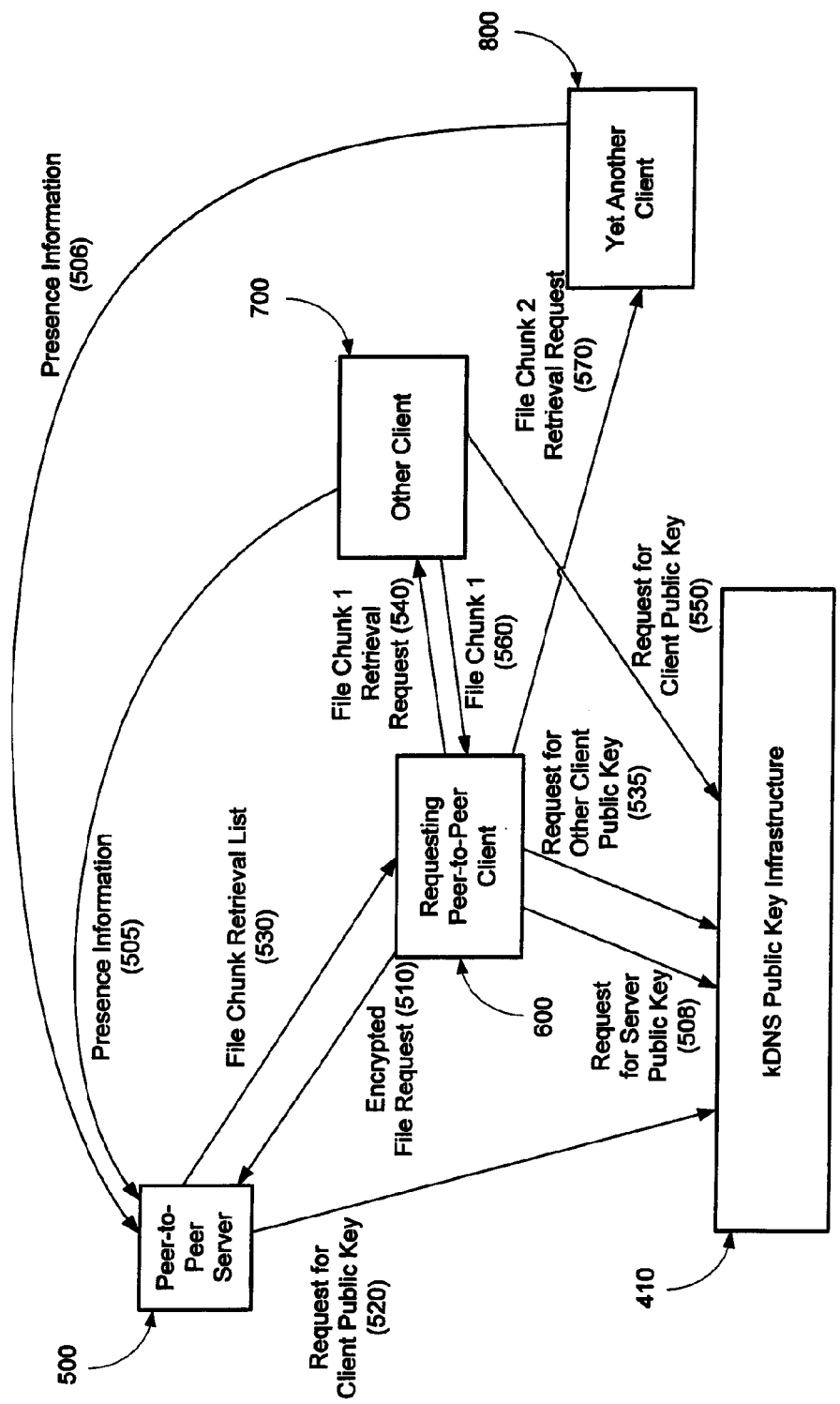
FIG. 3 shows elements of a system for managing presence information and secure peer-to-peer file transfer according to third embodiment of the present invention.
Figure 4A:
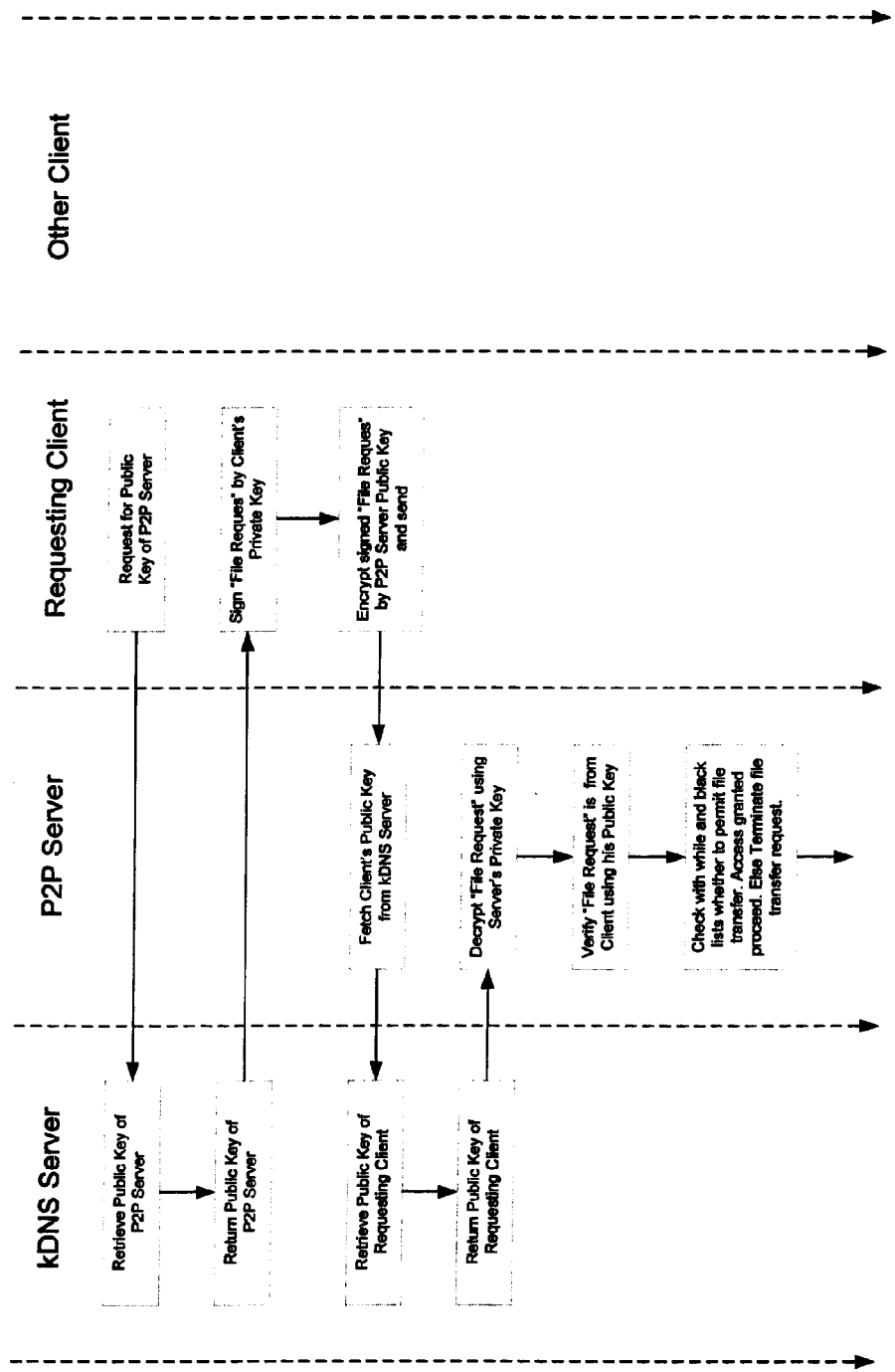
FIGS. 4a, 4b, 4c shows the sequence of steps in an embodiment of a method for establishment of a secure peer-to-peer communication session, using a system such as that shown in FIG. 3.
Figure 4B:
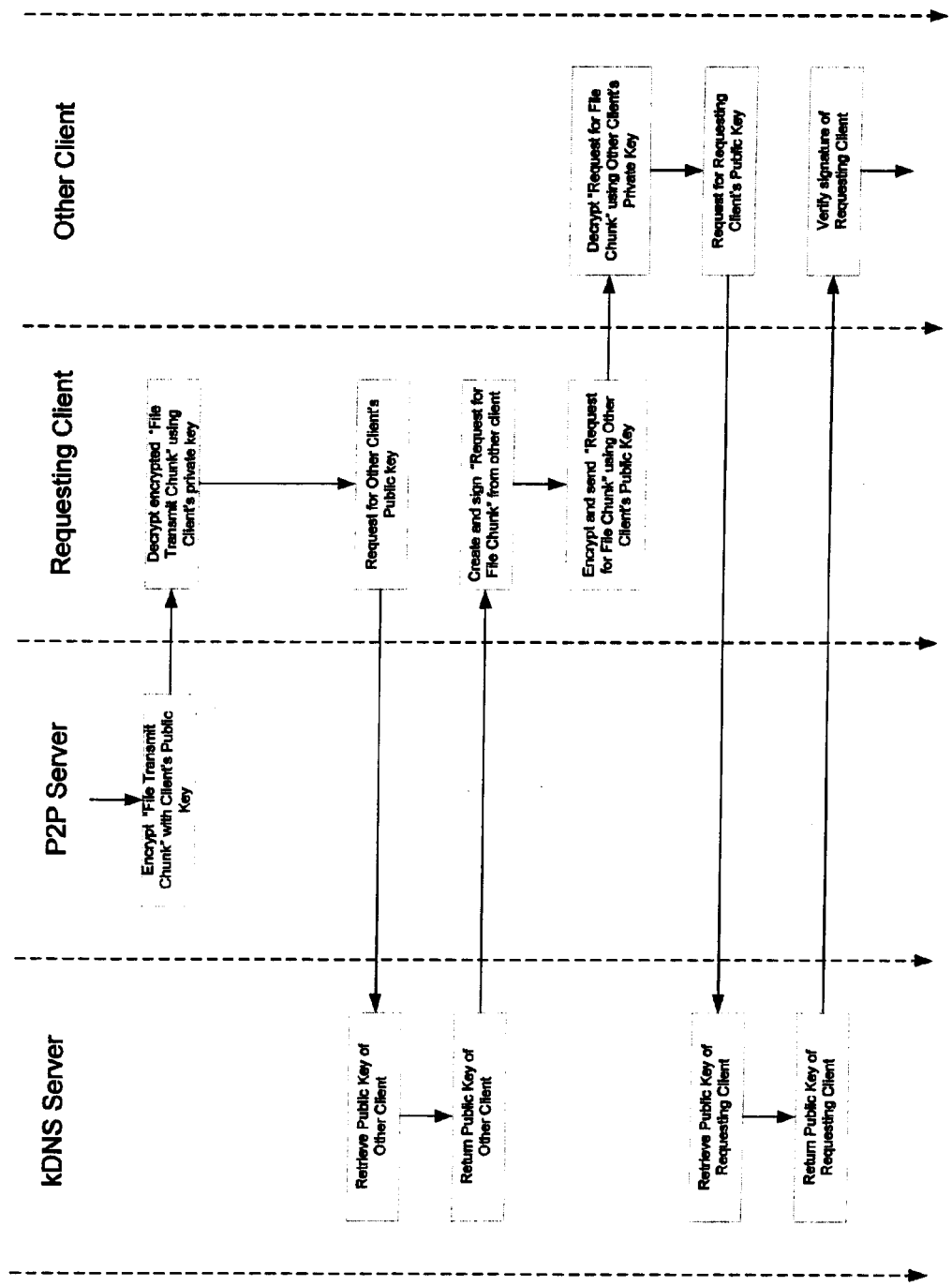
Figure 4C:
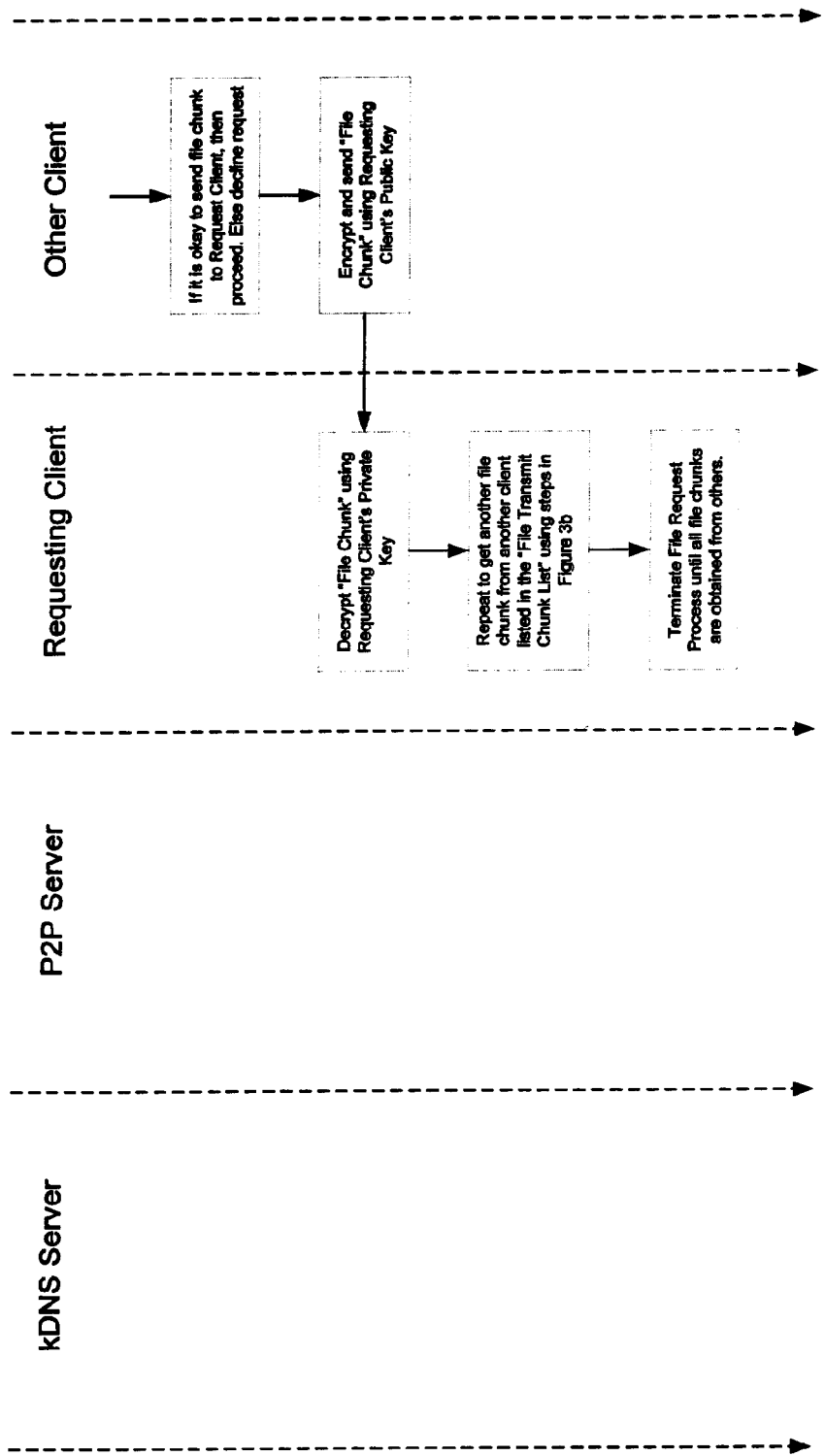

Referring to FIG. 3, which shows part of a system for managing presence information and secure peer-to-peer file transfer, a user (not shown) desiring download of a particular file uses his client 600 to address a peer-to-peer server 500. The peer-to-peer server holds information on
1. Presence and availability information—which user identities are available in the peer-to-peer network—in the example, "Other Client" 700 and "Yet Another Client" 800 have each sent a Presence Information message for their user identity (505 and 506, respectively) to show they are available.
2. Other information, which parts of files (e.g. file chunk 1, chunk 2 . . . ) are available on which client.

The Requesting Client 600 retrieves the public key associated with the peer-to-peer server's identity by a Public Key Request 508 to the Key DNS Public Key Infrastructure 410. Then, the Requesting Client 600 issues a request 510 for a particular file and encrypts it using the public key associated with the identity of the peer-to-peer server 500. In addition, the requesting client 600 signs the request using the private key associated with its own identity.

The peer-to-peer server 500 decrypts the file request 510 using its own private key. Then, the server asks the Key DNS Public Key Infrastructure 410 for the public key associated with the requesting user's identity. With this public key, it decrypts the user's signature. If that is successful, the user identity is authenticated.

Based on this authenticated identity, the peer-to-peer server 500 can decide whether or not to grant this request. The decision to grant another user access to personal information, which may comprise presence information, and may be based on criteria such as those described with respect to other embodiments, i.e. querying a Whitelist; querying a Blacklist; querying a third party system; obtaining confirmation of a successful online charging or charge reservation request.

If the peer-to-peer server 500 grants the client 600 access to the requested file, it returns a File Chunk Retrieval List 530, i.e. a list of parts of the requested file along with the address of a client that is available to deliver this file part. This list can be encrypted using the public key of the user identity employed in the File Request 510 and retrieved in the Public Key Request 520. It may also be signed with the peer-to-peer server's private key. In this case, the server 500 must include an identity that can be used to retrieve the corresponding public key from the Key DNS Public Key Infrastructure 410.

In this example, the list 530 says that file chunk 1 is available at "Other Client" 700. The requesting client retrieves the public key associated with the Other Client's identity by a Public Key Request 535 to the Key DNS Public Key Infrastructure 410. Then, the Requesting Client issues a request 540 for file chunk 1 and encrypts it using the public key associated with the Other Client's identity. Optionally, it signs the request using the private key associated with its own identity.

The Other Client 700 decrypts the file chunk 1 request 540 using its own private key. If the requesting client's signature is included in the requested, and if the Other Client does not want to deliver to any client, it asks the Key DNS Public Key Infrastructure 410 for the public key associated with the requesting client's identity 550. With this public key, it decrypts the user's signature. If that is successful, the user identity is authenticated.

If the Other Client 700 approved delivery of the file chunk 1 to the authenticated requestor, it encrypts the file chunk 1 with the requesting client's 600 public key and sends it to the requesting client 560.

The same procedure is repeated for the other file chunks—e.g. with file chunk 2 residing at Yet Another Client 800. For simplicity, the key retrievals associated with the File Chunk 2 Retrieval Request 570, which would be similar to those described above, are not shown in FIG. 3.

If any of the clients in the list 530 returned by the peer-to-peer server 500 declines the request for a file chunk or goes offline before it delivers the file chunk requested, the requesting client 600 will request a list of alternative locations for the missing file chunks. This may continue until the client 600 has obtained the complete file or until it gives up.

A typical sequence of method steps, including key requests, performed by the requesting client, P2P server and kDNS server for implementing the method described above are shown in FIGS. 4a, 4b, and 4c.

To deter users from copying of payable and/or protected content, some or all of the peer-to-peer clients involved in delivering the content to the user may encrypt and/or watermark the content. If a peer-to-peer client is requested to deliver a chunk of information to a specific user identity, it retrieves the public key associated with this user identity from kDNS and uses this key for encrypting and/or watermarking the content.

Digital rights management aware clients may require the content to be stored in encrypted form so that an unencrypted version of the content is never available outside applications processing the content. Alternatively, digital rights management aware clients may require the content to be watermarked with a public key for which the user has the corresponding private key. When protected content is retrieved with a user identity whose private key is later published, updates of the client software can lock out such user identities.

Figure 5:
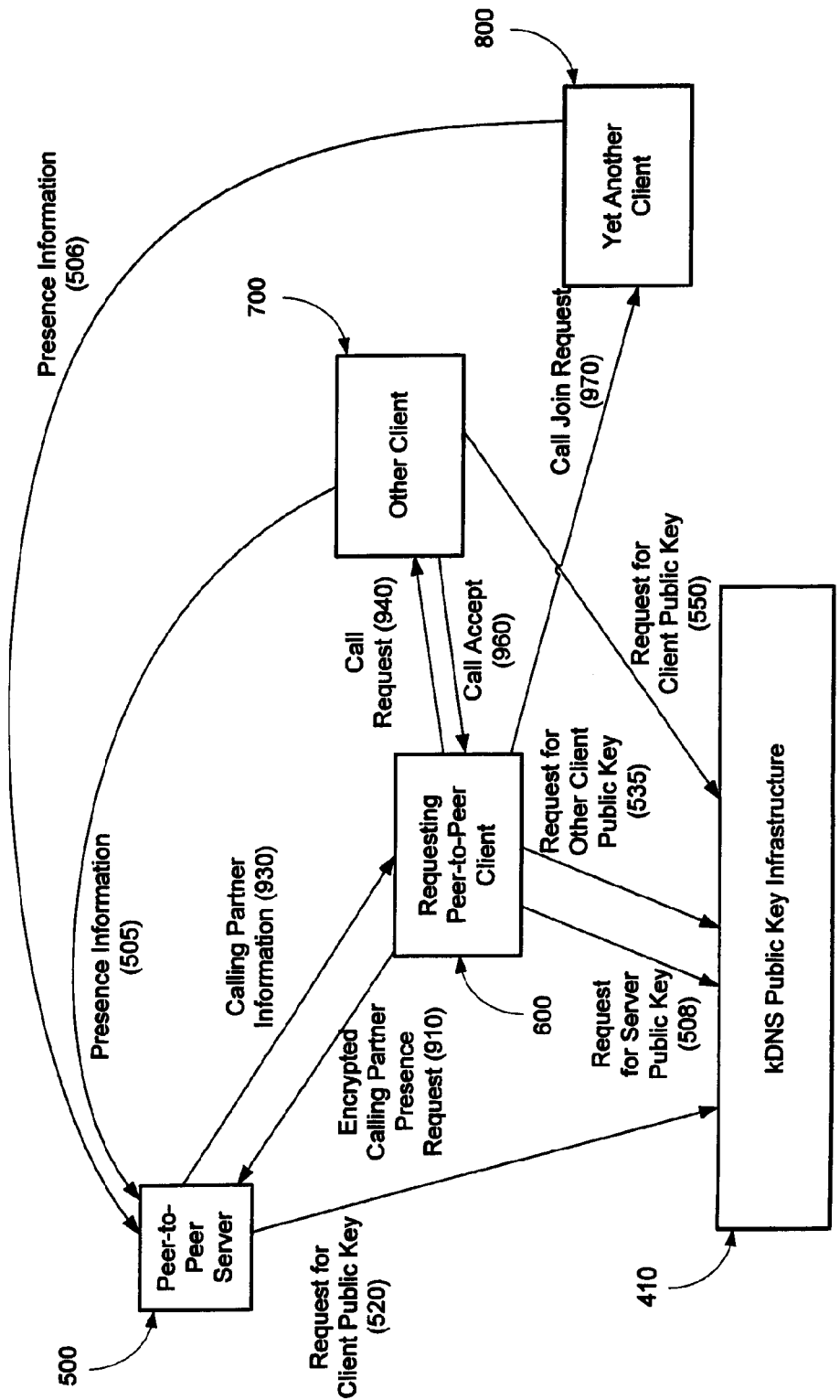
FIG. 5 shows elements of a system for managing presence information and establishing a secure communication session between two or more communications parties or clients according to a fourth embodiment of the present invention.

Referring to FIG. 5, which shows elements of a system for managing presence information and establishing a multiparty communication session between two or more users, a user (not shown) desiring to communicate with another user uses his client 600 to address a peer-to-peer server 500. The peer-to-peer server holds user information comprising presence information, i.e.

1. which user identities are available in the peer-to-peer network—in the example, "Other Client" 700 and "Yet Another Client" 800 have each sent a Presence Information message for their user identity (505 and 506, respectively) to show they are available.
2. which communication preferences these clients and their users have
3. under which client a particular user identity can be reached.

The Requesting Client 600 proceeds in a similar way as for the file download described above, except that it sends an encrypted and signed Calling Partner Presence Request 910 to find out whether the desired communication partner is available, what his communication preferences are and how he can be reached.

The peer-to-peer server 500 authenticates the request 910 in the same way as described for the request 510 in FIG. 3. If the peer-to-peer server 500 grants the client 600 access to the presence information of the desired communication partner, it returns Calling Partner Information 930, i.e. information on how to reach the desired communication partner.

In our example, the Calling Partner Information message 930 says that the desired communication partner is available at "Other Client" 700. The requesting client retrieves the public key associated with the desired user identity by a Public Key Request 535 to the Key DNS Public Key Infrastructure 410. Then, the Requesting Client issues a Call Request 940 and encrypts it using the public key associated with the Other Client's identity. It signs the call request using the private key associated with its own identity.

The Other Client 700 decrypts the call request 940 using its own private key. Then the Other Client asks the Key DNS Public Key Infrastructure 410 for the public key associated with the caller's identity 550. With this public key, it decrypts the user's signature. If the Other Client 700 accepts the authenticated call request 940, it returns a Call Accept message 960 that is encrypted with the caller's public key. From that time on, a communication session is established and the communication partners can exchange encrypted information until one party drops the session.

Figure 6A:
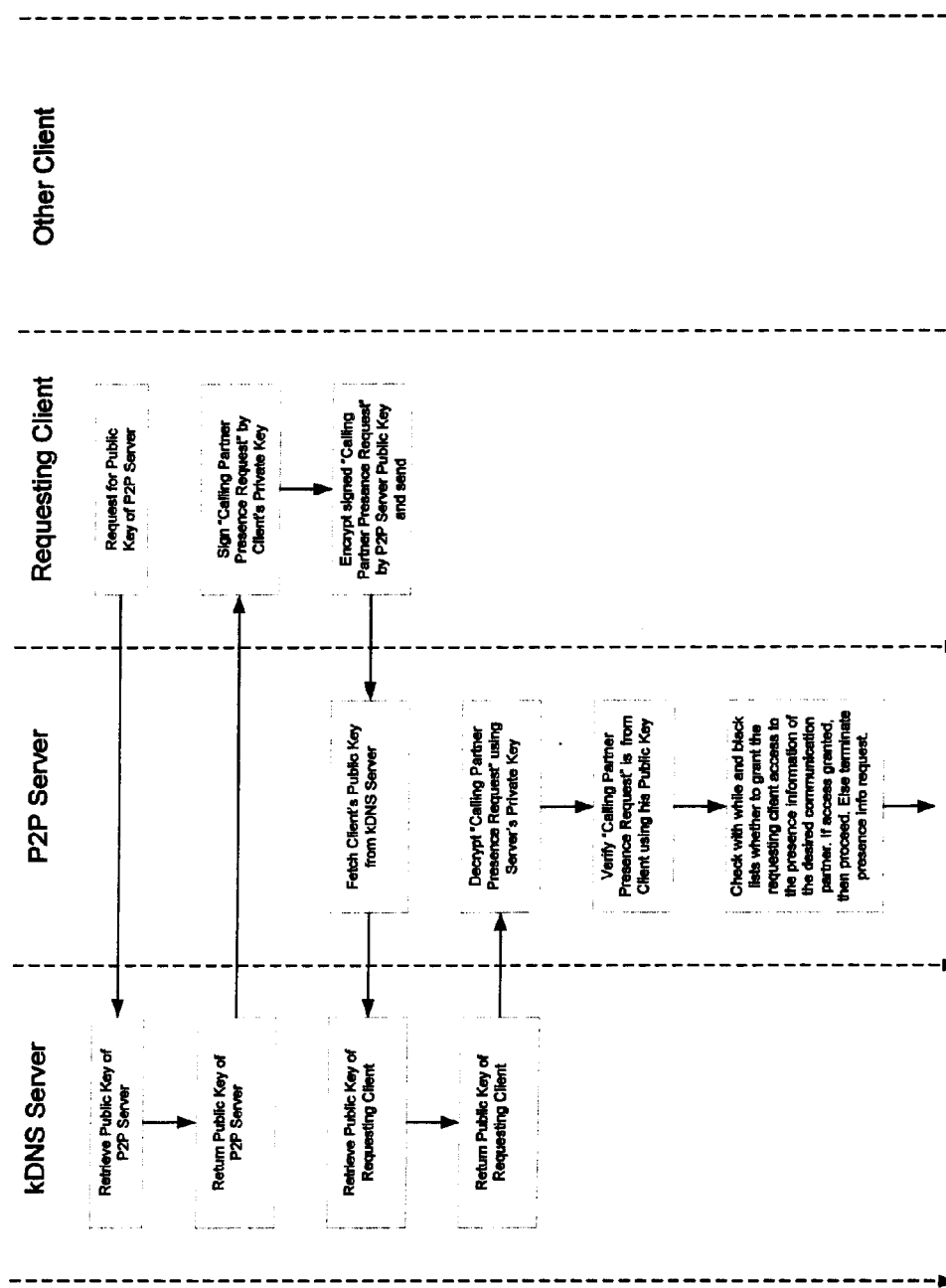
FIGS. 6a, 6b, 6c show a sequence of steps in an embodiment of method for managing presence information and establishing a communication session between two or more communication parties or clients, using a system such as that shown in FIG. 5.
Figure 6B:
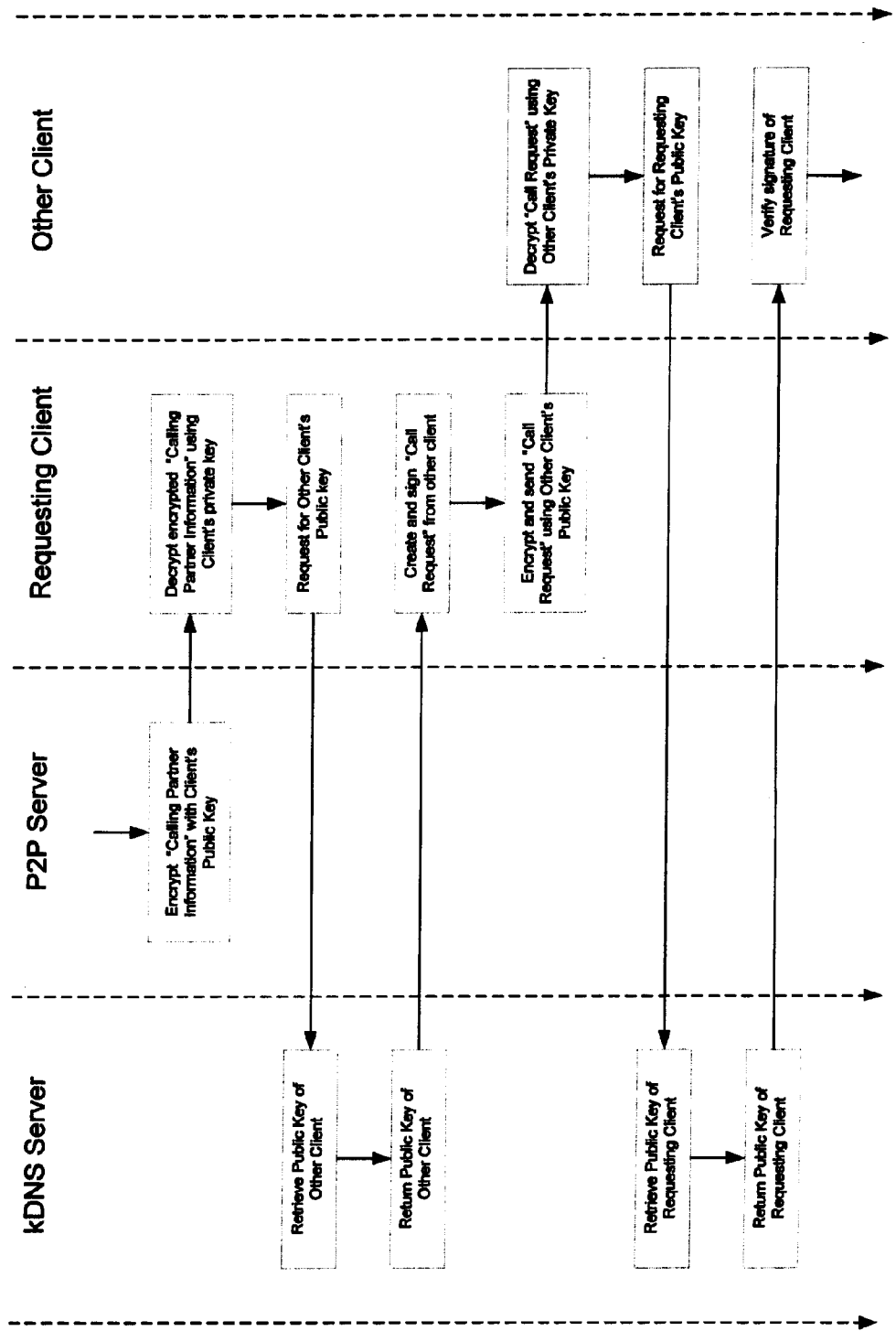
Figure 6C:
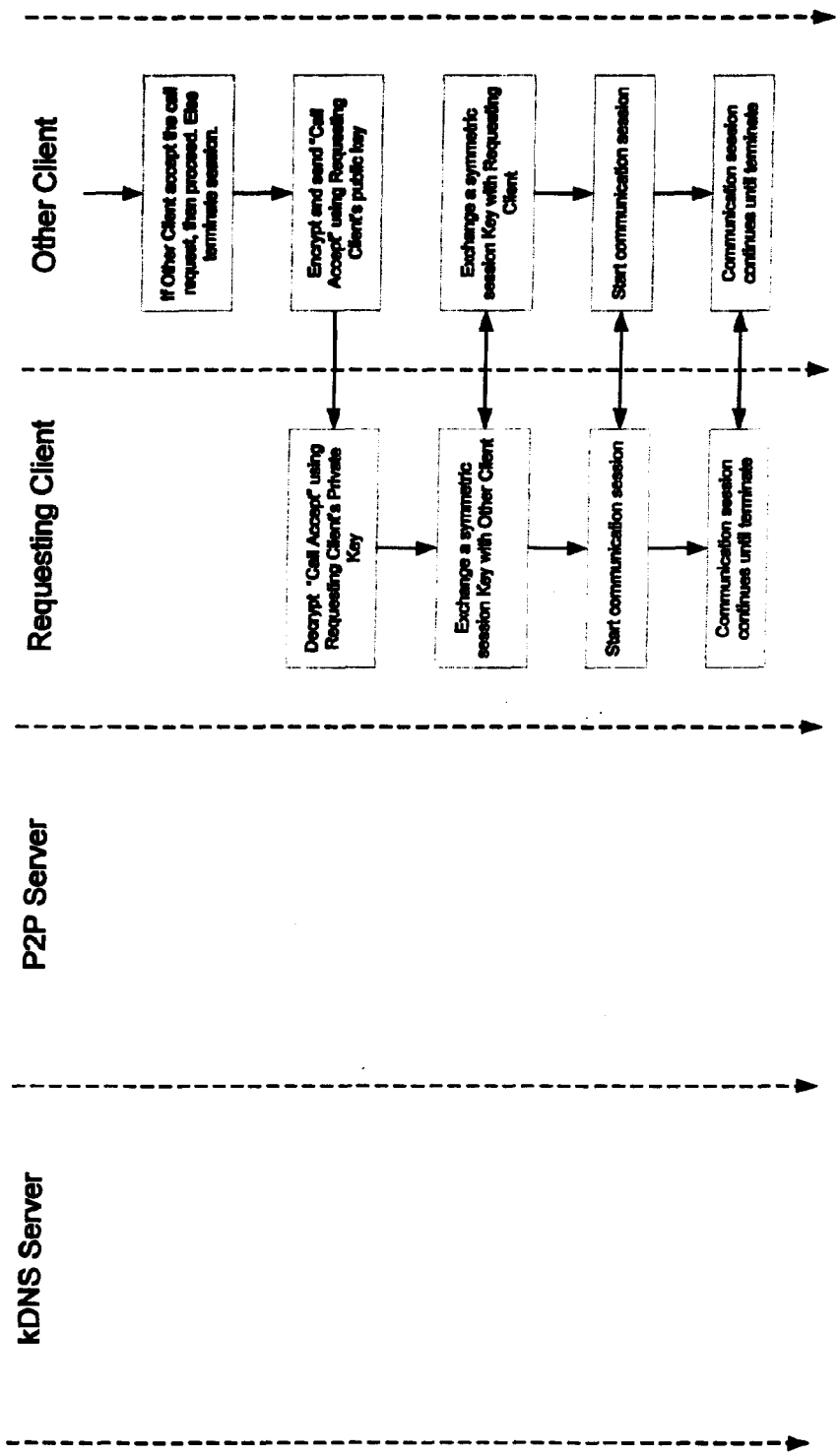

FIGS. 6a, 6b, 6c show a sequence of method steps involving a setting up a secure communication session involving a requesting client, a P2P server (call server), a kDNS server, and another client.

In a similar way, the point-to-point communication session can be extended to a conference session. After one of the existing communication partners—in our example, the Requesting Client 600 or the Other Client 700—has retrieved presence information about the next desired communication partner—residing on Yet Another Client 800 in our example, it can address a Call Join Request 970 to this client.

When more than two partners take part in the communication session, point-to-point communication has to be extended to any-to-any communication. Peer-to-peer networking strategies can be used to reduce network load—e.g. when content originating at one client is distributed by several clients, so as to reduce the traffic peak at the originator.

With the authentication mechanisms described here, other outside clients may actively join the conference if the conference moderator has granted access for all callers, for a list or group of users, or interactively for a requesting user.

In each of the embodiments described above, because the authentication of users to create, modify, delete or access personal information—whether that be long-term (infrequently updated) or short-term (dynamic, frequently updated) information such as presence information—is based on a generic global kDNS (Public Key Domain Name Service) infrastructure, there is no need for application specific user identities and registration thereof. Application servers only need to hold user data specific to the application and can offload registration and generic user information storage to application independent servers. This includes generic presence and communication preference information.

1. Users' access to new applications building on the global kDNS infrastructure is facilitated significantly, making faster acceptance of new applications possible.
2. The system can be applied to many kinds of services, including, but not restricted to:
   media downloads,
   point-to-point and multiparty telephony and conferencing, employing voice, multimedia, document sharing and group collaboration,
   chat and push-to-talk sessions,
   multiplayer games and applications, such as virtual worlds and virtual jamming.

With the help of user identities spanning several applications, users may potentially use the trust built in one application to get preferred treatment in another. On the other hand, users can still control their privacy by employing multiple user identities for different applications. Depending on the individual's choice, these user identities may be completely unrelated, or may be jointly managed on a presence or personal information server of the user's trust.

Because security and privacy protection is an integral part of the approach, efforts for application specific encryption measures are unnecessary. It is, however, still possible to furnish specific user groups with a higher level of security by using longer keys or specific encryption/decryption algorithms.

to The combination of security and privacy also allows for personalization of content, copy protection and digital rights management, as well as management of payment for chargeable services from a common account.

INDUSTRIAL APPLICABILITY

The systems and methods described herein enable presence information, other associated user information for communication services and peer-to-peer services to be managed with public keys of public-private key pairs bound to user identifiers such as email addresses or other communications addresses. The public keys of communication parties are managed by a kDNS service, which provided for look-up and retrieval of public keys by other users. Thus communications services, including peer-to-peer services with improved security can be built on a generic infrastructure, with minimal changes to applications and minimal if any requirements on access providers. This infrastructure can be used to protect and personalize content provided, to charge for services, to control access to services, all without a need for application specific registration.

Although embodiments of the invention have been described and illustrated in detail, it is to be clearly understood that the same are by way of illustration and example only and not to be taken by way of the limitation, the scope of the present invention being limited only by the appended claims.

The invention claimed is:

1. A system for managing presence information for communication services comprising:
  at least one network element comprising a presence server storing presence information for each of a plurality of communication parties;
  means for authenticating a communication party requesting presence information management comprising:
  client means for generating a request from a communication party for management of presence information, the request comprising a unique identifier of the requesting party and being signed with the private key of a public-private key pair of the requesting party; and
  server means for querying a key Domain Name Service (kDNS) for the respective public key of the requesting party and authenticating the requesting party, and returning a response to the request for presence information management dependent on an authentication status of the requesting party.

2. A method of managing presence information stored on at least one network element, comprising a step of authenticating a communication party requesting presence information management by steps comprising:
  receiving a request from a communication party for management of presence information, the request comprising a unique identifier of the requesting party and being signed with the private key of a public-private key pair of the requesting party;
  querying a key Domain Name Service (kDNS) for the respective public key, authenticating the requesting party, and returning a response dependent on an authentication status of the requesting party.

3. A method of managing presence information for a plurality of communication parties, comprising:
  authenticating a party requesting presence information management by steps of:
  receiving from the requesting party a request for presence information management comprising a unique identifier of the requesting party and a corresponding encrypted identifier encrypted with the private key of a public-private key pair of the requesting party;
  querying a key domain name service (kDNS) for a public key associated with the unique identifier of the requesting party, decrypting the request, and authenticating the requesting party, and,
  returning a response to the request for presence information management dependant on an authentication status of the requesting party.

4. A system for managing presence information for communication services, comprising:
  at least one network element comprising a presence server storing presence information for a plurality of communication parties, the network element comprising a processor configured for authenticating a party requesting presence information by steps comprising:
  receiving from the requesting party a request for presence information management comprising a unique identifier of the requesting party and a corresponding encrypted identifier encrypted with the private key of a public-private key pair of the requesting party;
  querying a key domain name server (kDNS) system for a public key associated with the unique identifier of the requesting party, decrypting the request, and authenticating the requesting party; and
  returning a response to the request for presence information management dependent on an authentication status of the requesting party.

5. A system according to claim 4 wherein the network element is further configured to return a response to the request for presence information management comprising one of: storing presence information associated with an authenticated requesting party retrieving user information associated with a unique identifier of another party requested by the authenticated requesting party and otherwise terminating the request for an unauthenticated requesting party.

6. A system according to claim 4 wherein the network element is further configured for managing presence information records associated with an authenticated requesting party comprising storing new presence information and updating presence information, wherein presence information management privileges of the requesting party are dependent on the result of the requesting party authentication and the requesting party identity used in the request.

7. A system according to claim 4 wherein the network element is further configured for retrieving presence information associated with a unique identifier of another party requested by the authenticated requesting party by steps of querying the presence information of another party for access privileges of the requesting party, and returning a response in accordance with access privileges.

8. A client-server system for managing storage and retrieval of presence information for communications services for a plurality of communication parties, each party having a unique identifier and an associated public-private key pair, the system comprising:
  at least one network element comprising a presence server storing presence information for each of a plurality of communications parties;
  a key Domain Name Service (kDNS) system storing for each communication party a unique identifier and the respective public key for public-key look-up and retrieval; and
  each communication party having a communications client associated with their unique identifier and providing secure access to the respective private key of the communication party;
  the at least one network element comprising means for receiving from a client a request for storage or retrieval of presence information associated with a unique identifier of a communication party, the requesting client providing at least a unique identifier of the requesting party, and a corresponding encrypted identifier encrypted with the private key of the requesting party;
  querying the kDNS system for the public key associated with the unique identifier of the requesting party, decrypting the request, and authenticating the requesting party; and
  returning a response dependent on the authentication status of the requesting party.

9. A system according to claim 8 wherein returning a response dependent on the authentication status of the requesting party comprises one of:
  storing presence information associated with the unique identifier of an authenticated requesting party;
  retrieving presence information associated with a unique identifier of another party requested by an authenticated requesting party;
  otherwise terminating the request for an unauthenticated requesting party.

10. A system according to claim 8 wherein the client comprises means for encrypting the request with the private key of the requesting party.

11. A system according to claim 8 wherein the response to the requesting client is signed with a private key of the network element, and the client of the requesting party comprises means for querying a kDNS system for look-up of the respective public key of the network element and authenticating the network element.

12. A system according to claim 8 wherein the network element has a unique identifier and associated public-private key pair, and the network element is operable to encrypt the response to the requesting client with the private key of the network element, and the client of the requesting party comprises means for querying a kDNS system for look-up of the respective public key of the network element and decryption of the response.

13. A system according to claim 8 wherein stored presence information comprises information determining access privileges for requesting parties, and wherein the network element, after authentication of a requesting party, is operable to determine access privileges of the requesting party to user information associated with a unique identifier, and return a response to the requesting party in accordance with said access privileges.

14. A communication client for a client-server system for management of user information comprising presence information for plurality of users of communications services stored on a at least one network element comprising a presence server, wherein each communication party has a unique identifier and an associated public-private key pair, and wherein unique identifiers and respective public keys for each communication party are stored in a key domain name server (kDNS) system for public-key look-up and retrieval, the client comprising instructions stored in a non-transitory computer readable storage medium which, when executed in a processor, perform the steps of:

generating a request for management of presence information, the request comprising the unique identifier of the communication party and an encrypted identifier encrypted with the private key of the requesting communication party;

querying the kDNS server for the public key associated with the unique identifier of the network element, and for authenticating a response received from the network element encrypted the private key of the network element.

15. A communication client according to claim 14 wherein said instructions further perform the steps of encrypting a request with the private key of the requesting party, and decrypting a response received from the network element encrypted with the private key of the network element.

16. A communication client according to claim 14 wherein said instructions further perform the steps of:

initiating an encrypted communication request comprising generating a call request, the request comprising the unique identifier of the communication party and an encrypted identifier encrypted with the private key of the requesting communication party;

receiving and decrypting a corresponding encrypted communication request from another communication party to authenticate the other party; and responding to a call request dependent on the authentication status of the other party to initiate a communication session, or otherwise terminating the request.

17. A communication client according to claim 14 wherein said instructions further perform the steps of:

initiating a encrypted information request comprising generating an information request, the request comprising the unique identifier of the communication party and an encrypted identifier encrypted with the private key of the requesting communication party; and receiving and decrypting to a corresponding encrypted information request from another communication party to authenticate the other party;

responding to an information request dependent on the authentication status of the other party to return a response to the information request, or otherwise terminating the request.

\* \* \* \* \*